(12) United States Patent
Gallo et al.

(10) Patent No.: US 9,031,503 B2
(45) Date of Patent: May 12, 2015

(54) WIRELESS DATA COMMUNICATIONS

(71) Applicant: NXP B.V., Eindhoven (NL)

(72) Inventors: Francesco Gallo, Graz (AT); Paul Bakker, Eindhoven (NL)

(73) Assignee: NXP B.V., Eindhoven (NL)

( * ) Notice: Subject to any disclaimer, the term of this patent is extended or adjusted under 35 U.S.C. 154(b) by 104 days.

(21) Appl. No.: 13/771,516

(22) Filed: Feb. 20, 2013

(65) Prior Publication Data

US 2014/0235162 A1    Aug. 21, 2014

(51) Int. Cl.
*H04B 5/00* (2006.01)
*H04W 52/02* (2009.01)

(52) U.S. Cl.
CPC ......... *H04B 5/0056* (2013.01); *H04W 52/0229* (2013.01); *H04B 5/0031* (2013.01)

(58) Field of Classification Search
USPC .................... 455/41.1, 41.2; 340/10.1, 10.51; 711/100
See application file for complete search history.

(56) References Cited

U.S. PATENT DOCUMENTS

2010/0090810 A1*  4/2010  Gallo et al. ................. 340/10.51
2014/0068145 A1*  3/2014  Gallo et al. ................... 711/103

OTHER PUBLICATIONS

NFC Forum Technical Specification "Connection Handover" v1.2 Jul. 2010.
NFC Forum Technical Specification "Type 4 Tag Operational" v.2.0 Nov. 2010.
NFC Forum Technical Specification "Type 1 Tag Operational" v.1.1 Apr. 2011.
NFC Forum Technical Specification "Type 2 Tag Operational" v.1.1 May 2011.
NFC Forum Technical Specification "Type 3 Tag Operational" v.1.1 Jun. 2011.
NFC Forum "Simple NDEF Exchange Protocol" Technical Specification. Aug. 2011.
NFC Forum, Bluetooth SIG Application Document "Bluetooth Secure Simple Pairing Using NFC" Oct. 2011.

* cited by examiner

*Primary Examiner* — Nguyen Vo

(57) ABSTRACT

Near-field communication (NFC) is effected in a manner that ensures that messages are read. In accordance with one or more embodiments, an apparatus includes a NFC antenna, a NFC tag and a host connected to the NFC tag via both a data communication circuit and a field detection circuit. The NFC tag stores and transmits an NFC data exchange format (NDEF) message via the NFC antenna. The NFC tag includes first and second registers respectively having data indicative of a read status of the NDEF message and data indicative of a last portion/byte of the NDEF message data. When the NDEF message is accessed (e.g., transmitted), the NFC tag sets the data in the first register to indicate that the NDEF message has been read (e.g., sets a bit value). The trigger circuit generates a trigger signal in response to the status, indicating that the NDEF message has been read.

20 Claims, 3 Drawing Sheets

WIRELESS DATA COMMUNICATIONS

Wireless communications have seen increasing use in a variety of fields and devices. For instance, identification products such as smart cards and RIFD (Radio Frequency Identification) tags are used widely in fields such as transport (e.g., ticketing, road tolling, baggage tagging), finance (e.g., debit and credit cards, electronic purses, merchant cards), communications (e.g., SIM cards for GSM (Global System for Mobile Communications) phones), and tracking (e.g., access control, inventory management, asset tracking) Many such applications involve products compliant with international standard ISO14443A identification cards, and provide RF (Radio Frequency) communication technology for transmitting data between a card or tag and a reader device. For example, in electronic ticketing for public transport, travelers can wave a card over a reader at turnstiles or other entry points, facilitating convenience and speed in the ticketing process.

Another type of wireless communication involves near-field communications (NFC), which is a type of contactless communications (e.g., for identification and networking technologies) that involves short-range wireless technology. Such applications often involve communication distances of a few centimeters, and have been used for secure communications between various devices without necessarily involving user configuration. In order to make two devices communicate, users bring them close together or even make them touch. The devices' NFC interfaces connect and configure themselves to form a peer-to-peer network. NFC can also bootstrap other wireless communication protocols, such as by exchanging the configuration and session data.

While wireless communications as discussed above have been useful, effecting such communication in an efficient, secure and reliable manner can be challenging. For example, data communications may be lost when a distance between devices is too great, or when communicated data becomes corrupt. These and other matters have presented challenges to different types of communications, for a variety of applications.

Various example embodiments are directed to wireless communication circuits and their implementation.

In accordance with one or more embodiments, stored NFC data exchange format (NDEF) message data is wirelessly communicated to a local NFC reader using a NFC protocol, and the communication is monitored to provide an indication when the NDEF message has been read (or at least accessed for transmission). In certain implementations, data indicative of a read status of the NDEF message data is stored in a first register, and data indicative of a last byte of the NDEF message data is stored in a second register. This data in the second register is used during an NDEF message read event to provide an indication as to when the entire message has been read. Accordingly, the data in the first register is set to indicate that the NDEF message data has been read, based upon the transmission of the NDEF message data and the last byte data in the second register. This data in the first register is used as an indicator or trigger concerning the read status of the NDEF message data, which can be used in a variety of manners (e.g., as a wake-up and/or to transition a NFC tag host device to operate in a wireless transmission mode).

Another embodiment is directed to an apparatus having a NFC antenna, an NFC tag, a host having a processor, a communication circuit connected to the NFC tag and the host, a field detection circuit connected between the NFC tag and the host, and a trigger circuit. The NFC tag stores and transmits NDEF message data via the NFC antenna, using an NFC protocol. The communication circuit passes data from the host to the NFC tag, and from the NFC tag to the host. The NFC tag also includes first and second registers respectively having data indicative of a read status of the NDEF message data, and data indicative of a last byte of the NDEF message data. The NFC tag sets the data in the first register to indicate that the NDEF message data has been read in response to transmission of the NDEF message data, based upon the last byte data. A trigger circuit generates a trigger signal in response to the read status of the NDEF message indicating that the last byte has been read, and presents the trigger signal via the field detection circuit.

Another embodiment is directed to an apparatus having a host and an NFC protocol tag with an antenna and first and second registers, and which communicates using an NFC protocol. The first register has configuration data that facilitates remote-field communications via a second protocol that is different than the NFC protocol, and the second register has data indicative of a last accessed byte of the configuration data. The NFC tag uses RF energy received from a remote reader circuit to operate as follows. In response to a NFC protocol RF communication received from the remote reader circuit, the configuration data is accessed from the first register, the accessed configuration data is transmitted via the antenna using the NFC protocol, and a trigger signal is generated in response to a last byte of the configuration data being accessed (e.g., being transmitted). The host is connected to the NFC tag, operates in a sleep mode in which the host circuit does not wirelessly communicate via the second protocol, and transitions from the sleep mode to a wake mode in response to the trigger signal. While operating in the wake mode, the host accesses and uses the configuration data to communicate with the reader circuit (e.g., a host device/base station including an NFC reader) via RF communications of the second communication protocol.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
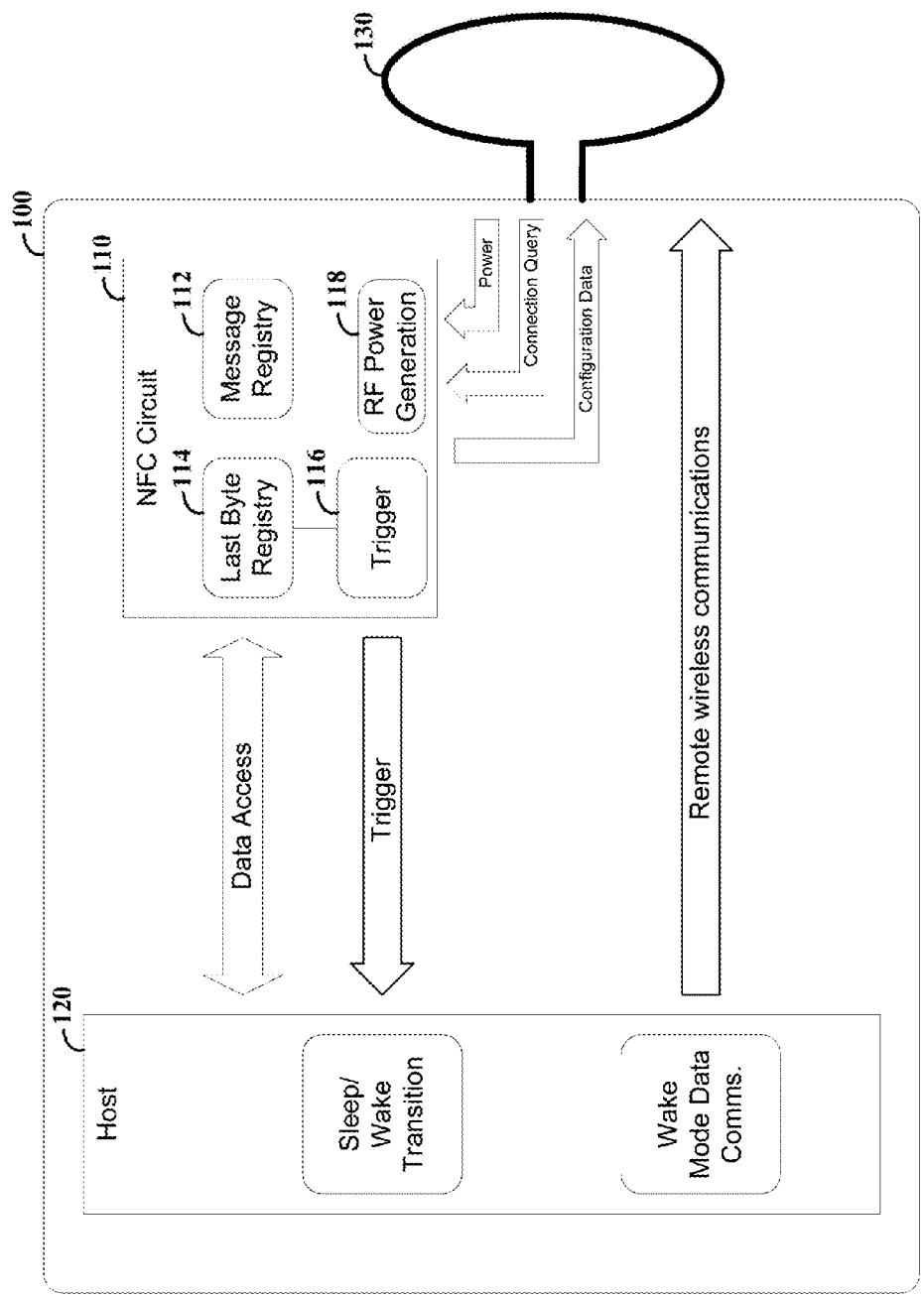
FIG. 1 shows an NFC apparatus, in accordance with an example embodiment.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving wireless communications, such as near-field communications. While not necessarily so limited, various aspects may be appreciated through a discussion of examples using this context.

Various example embodiments are directed to wireless communications, such as near-field communications, involving a tag-type circuit that is responsive to a wireless signal received from a reader. The tag-type circuit stores and provides a data set to the reader, using an approach that facilitates detecting that all data within the data set has been accessed. The tag-type circuit includes an interface configured and arranged to communicate with a host circuit and provide thereto an output indicative of the completion of the access (e.g., the access to or communication of data responsive a read command). The output may, for example, be provided by setting a trigger value indicative of the completion of a read step. Certain embodiments are directed to an apparatus including both the tag-type circuit and the host connected via the interface. In some implementations, the reader also wirelessly powers the tag-type circuit.

The tag-type circuit detects that data has been read using one or more of a variety of approaches. In some implementations, the tag-type circuit detects that all data within the set has been provided based upon the provision and/or communication of a designated last byte to be communicated in the data set, where the data is communicated sequentially in a manner that ends with the last byte. For such implementations, the tag-type circuit may include a register that stores the address of the last byte and, upon reading, is used as a trigger to indicate that the data set has been read out. In other implementations, the tag-type circuit detects that all data within the set has been provided based upon an amount of data in the data set. In certain implementations, another register is used to store information indicative that the last byte has been read, and a value in that register is set based upon the last byte (as identified in the other register) being accessed.

Various embodiments are directed to an apparatus including both the tag-type device and host, where the apparatus transitions between communication types based upon an indication that the tag-type device has communicated all data. In some instances, this transition involves a handover between a first near-field communication phase in which the tag-type device establishes a communication protocol link with the reader, and a second, different type of communication phase using a different communication protocol, in which the host begins operation by communicating with the reader-type device using a communication protocol for the second phase. This approach facilitates an initial setup of communication data via a secure, near-field link (e.g., where the reader and tag-type device touch or nearly touch), in a manner that ensures all appropriate data has been communicated to the reader before transitioning to the second communication phase. For instance, a first communication phase may involve near-field communications using RFID protocols (e.g., ISO/IEC 14443), and the second communication phase may involve wireless communications using one or more of Wi-Fi (e.g., IEEE 802.11 standards), Bluetooth (e.g., IEEE 802.11b-1999) or ZigBee (e.g., IEEE 802.15.4) protocols.

In accordance with another embodiment, an apparatus includes a NFC antenna and tag circuit that stores NDEF message data, and that transmits the NDEF message data via the NFC antenna, using a NFC protocol. The apparatus also includes a host circuit having a processor, a data communication circuit (e.g., an I2C link) connected to the NFC tag circuit and the host circuit, in which the data communication circuit passes data from the host circuit to the NFC tag circuit and from the NFC tag circuit to the host circuit. A field detection circuit (e.g., a field pin connected by a wire) is connected between the NFC tag circuit and the host circuit, and provides a trigger indication to the host circuit, that the NDEF message data has been read. More specifically, the NFC tag circuit includes a first register having stored data indicative of a read status of the NDEF message data, and a second register having stored data indicative of a last byte of the NDEF message data. The NFC tag circuit uses the data indicative of the last byte of the NDEF message data to set data in the first register circuit to indicate that the NDEF message data has been read (e.g., responsive to the transmission of the NDEF message data). A trigger circuit generates or otherwise provides a trigger signal in response to the NDEF message status data indicating that the last byte of the NDEF message data has been read, and the trigger signal is provided via the field detection circuit. The trigger signal is generated, for example, in response to at least one of: a request for reading the last byte of the NDEF message data, and the communication of the last byte of the NDEF message data. In some implementations, the NFC tag circuit includes a RF energy circuit that powers the NFC tag circuit using RF power received from a remote reader circuit (via the antenna).

The NDEF message data includes one or more of a variety of types of information. In some embodiments, the NDEF message data includes configuration data, such as for establishing wireless communications between the reader and the host (e.g., non-NFC communications such as Bluetooth or Wi-Fi). The NFC tag circuit is responsive to receiving NFC communications from a remote reader circuit by accessing and transmitting configuration data to the remote reader circuit, via the antenna circuit, using the NFC protocol. In a more particular embodiment, the host circuit operates in a sleep mode in which the host circuit does not wirelessly communicate via the wireless communication protocol, and transitions from the sleep mode to a wake mode in response to the trigger signal. In the wake mode, the host communicates with the reader using the wireless communication protocol.

Another embodiment is directed to an NFC device having a host circuit and a tag circuit that includes an antenna circuit, a first register circuit having configuration data that facilitates remote-field communications via a second protocol that is different than the NFC protocol, and a second register circuit having data indicative of a last accessed byte of the configuration data. The NFC tag circuit operates using RF energy received from a remote reader circuit. In response to a NFC protocol RF communication from the remote reader circuit as received via the antenna circuit, the configuration data is accessed from the first register and transmitted to the remote reader circuit via the antenna circuit, using the NFC protocol. A trigger signal is generated in response to a last byte of the configuration data being accessed, based on the data indicative of the last accessed byte of the configuration data.

The host circuit is connected to the NFC tag circuit and operates in sleep and wake modes for wirelessly communicating via the second protocol. The host circuit transitions from the sleep mode to the wake mode in response to receiving the trigger signal from the NFC tag circuit. While operating in the wake mode, the host circuit accesses and uses the configuration data to communicate with the reader circuit via RF communications of the second communication protocol.

The data indicative of the last accessed byte may, for example, be indicative of the reading and/or transmission of the last byte. In some implementations, the configuration data includes bytes of data in a sequence and which is transmitted to the reader in sequence, and the data indicative of the last byte data is indicative of the sequentially last byte. The trigger signal is then generated in response to the last byte of the configuration data. In other implementations, the data indicative of the last accessed byte is indicative of a total number of bytes for the NDEF message, and used to indicate that the entire NDEF message has been accessed when the number of accessed bytes is the total number.

In some embodiments, the NFC protocol tag circuit provides access to the configuration data from the first register by the host circuit, in response to a read command received from the host circuit via a wired interface (e.g., an I2C interface). This access may, for example, be followed by the generation of a trigger signal when the last byte of the configuration data is accessed. In some implementations, the host circuit also accesses and uses the configuration data sent to the reader circuit (e.g., in response to the trigger signal), to verify wireless (non-NFC) communications from the reader circuit.

The trigger signal can be provided in a variety of manners. In some embodiments, a third register has data indicative of a read status of the NDEF message data, and the NFC protocol tag circuit sets a value of the data in the third register based on the data indicative of the last accessed byte of the configuration data. The trigger signal is then generated based upon the value of the data in the third register.

In a more particular embodiment, the NFC protocol tag circuit includes a memory circuit that stores encryption data. The host circuit communicates with the remote reader circuit by accessing the encryption data via the interface and using the encryption data to communicate with the remote reader circuit.

The connections between the NFC protocol tag circuit and the host circuit are made in a variety of manners to suit particular embodiments. In some implementations, the connections include a first data communication terminal/interface (e.g., a two-pin I2C terminal) for providing access to the first register circuit by the host circuit and for communicating data including the configuration data between the host circuit and the NFC protocol tag circuit. The connections also include a second terminal that serves to provide the trigger to the host.

The above and other types of NFC communication approaches can be implemented with smart cards as discussed above. In some embodiments, devices that implement secure NFC operate as a contactless smart card with cryptographic capabilities, such that confidential data and data that represents values is stored in a secure memory area and stays on the card. Authentication is performed by the NFC device itself and transmitted data can be encrypted by the NFC device using a private encryption key stored in the device's secure memory.

For general information regarding NFC, and for specific information regarding NFC type communications that may be implemented in connection with one or more embodiments described herein, reference may be made to the following specifications available from the NFC Forum of Wakefield, Mass.: NFC Data Exchange Format (NDEF) specification version 1.0; Type 1 Tag Operation Specification 1.1, Type 2 Tag Operation Specification 1.1, Type 3 Tag Operation Specification 1.1, Type 4 Tag Operation Specification 2.0, NFC Forum "NFC Data Exchange Format (NDEF)" Technical Specification, Technical Specification "Connection Handover" v1.2, and "Bluetooth Secure Simple Pairing Using NFC" 1.0; all of these documents are fully incorporated herein by reference.

Turning now to the figures, FIG. 1 shows an NFC apparatus 100, in accordance with another example embodiment. The apparatus 100 includes an NFC circuit 110 and a host 120 that are connected via data access and trigger links as shown, and an antenna 130. The NFC circuit 110 includes a message registry 112, a last byte registry 114, a trigger circuit 116 and an optional RF power generation circuit 118 that provides power for the NFC circuit using RF power received via antenna 130.

When the NFC circuit 110 receives a connection query from a remote reader via the antenna 130, the circuit 110 transmits message data (e.g., NDEF message data) in the message registry 112 to the remote reader via the antenna. Such data may include, for example, configuration data for establishing communications with the host 120. The last byte registry 114 stores information indicative of a last byte of the message data, and the trigger circuit 116 provides the trigger to the host 120 when the last byte has been read. In some implementations, the trigger circuit 116 includes a register and stores information therein indicative of whether or not the last byte has been read, and this information is provided for access by (e.g., communication to) the host 120.

The host 120 is responsive to the trigger by operating to communicate with the reader, using remote wireless communications. In some implementations, these communications are implemented via the antenna 130, using a communication protocol that is different than an NFC protocol used to communicate the data in the message registry 112. In other implementations, separate antennas are used for NFC communications and for the remote wireless communications. In certain embodiments, the host 120 operates with a sleep/wake transition circuit as shown, which is responsive to the trigger by transitioning between sleep and wake modes such as described herein. The remote wireless data communications are effected via the operation of a wake-mode communication circuit as shown.

Figure 2:
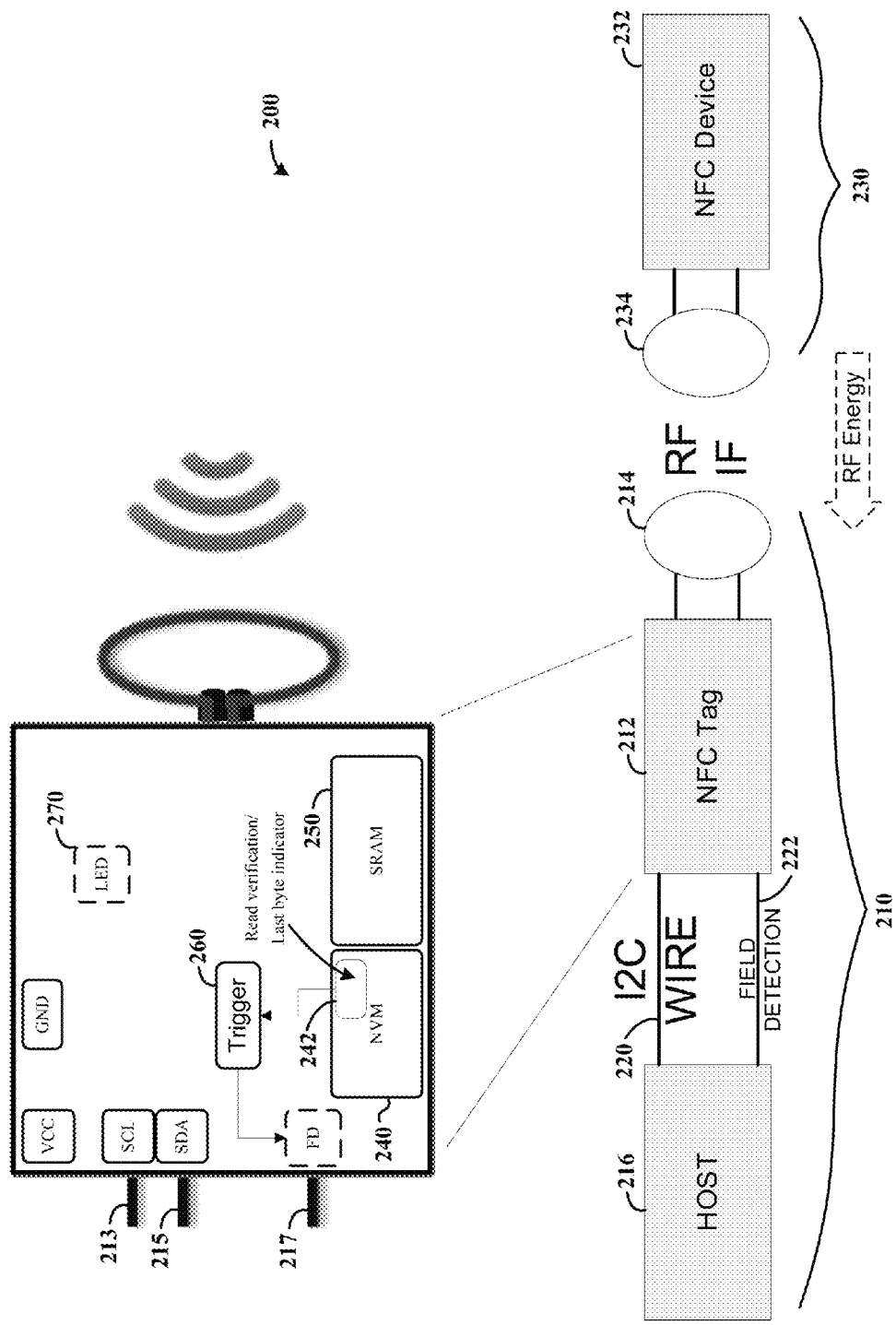
FIG. 2 shows an apparatus including an NFC device that operates to ensure/verify the communication of a configuration data set to an NFC reader, in accordance with another example embodiment.

FIG. 2 shows an apparatus 200 including an NFC device 210 that operates to ensure/verify the communication of a configuration data set to an NFC reader 230, in accordance with another example embodiment. The NFC device 210 includes an NFC tag 212 that has a near-field antenna 214, and a host circuit 216 connected to the NFC tag via a wired interface at the NFC tag. By way of example, the connection between the NFC tag 212 and host circuit 216 is shown via link 220 that uses I2C communications (available from NXP Semiconductors of Eindhoven, The Netherlands), and a field detection link 222. The host circuit 216 accesses the NFC tag 212 via the I2C link 220, to access one or more of memory, interface pins, and registries.

The NFC reader 230 includes an NFC device 232 and an antenna 234, which operate to communicate with the NFC tag 212, which transmits configuration-type data to the NFC device 232 via the antennas 214 and 234. In some implementations, the NFC tag 212 operates using wireless power received from the NFC device 232, via antennas 214 and 234. In some embodiments, the apparatus 200 (or a system thereof) includes the NFC reader 230.

The NFC tag 212 communicates near-field wireless communications, including a configuration data set, via the antenna 214 for receipt by the antenna 234. The configuration data is used to establish communications between the apparatus 200 and the NFC reader 230. These communications may be established, for example, by pairing or otherwise linking the apparatus 200 with the NFC reader 230. The NFC tag 212 provides an indication of the completion of the communication of the configuration data to the host device 216, which the host device can use in a variety of manners (e.g., by transitioning to a communication state in which communications with the NFC reader 230 are made in accordance with the configuration data).

The NFC tag 212 can be implemented in a variety of manners, to suit particular applications or embodiments. The inset portion in FIG. 2 shows one such example embodiment.

The NFC tag 212 includes an interface having clock line (SCL) 213 and data line (SDA) 215 I2C pins, and a field detection pin 217. The NFC tag 212 also includes NVM (Non-Volatile Memory) 240 and SRAM (Static Random-Access Memory) 250, with the NVM including a read verification/last byte indicator 242 that is used as an indication that a configuration data set stored in the NFC tag has been read out.

In a more particular embodiment, the read verification/last byte indicator 242 is implemented with two registers, accessible from the I2C interface, for respectively indicating that the configuration data has been read, and the address of the last byte of the configuration data. In some implementations, these registers are implemented as a NDEF_READ register, and as a LAST_NDEF_BYTE_ADDRESS register, for use with the NFC Data Exchange Format. When the NFC device 232 operates the NFC tag 212 to read out the NDEF message, as soon as the memory at the address indicated by LAST_NDEF_BYTE_ADDRESS is read the NDEF_READ indicates that the NDEF message has been read, and the trigger circuit 260 triggers the host circuit 216 by changing its signal value from low to high or from high to low. The value stored in the LAST_NDEF_BYTE_ADDRESS register depends on the addressing method used by the NFC tag 212, such as in accordance with the NDEF specifications Types 1-4 referenced above (respectively, 1 block being 8 bytes (I), 1 page being 4 bytes (II), 1 block being 16 bytes (III), and containing the byte address of the NDEF file(IV)). In certain types of NFC tag implementations, the LAST_NDEF_BYTE_ADDRESS is not limited to such addressing approaches.

In some implementations, the NFC tag 212 as shown in the inset includes trigger circuit 260 that generates a trigger signal, responsive to the read verification/last byte indicator 242 indicating that the configuration data has been read out. This trigger signal is provided to the host 216, which operates in response to the trigger signal.

In other implementations, the NFC tag 212 shown in the inset includes an indicator circuit 270, such as a light-emitting diode. The trigger circuit 260 activates the indicator circuit to provide a visual indication that the read verification/last byte indicator 242 has indicated that the configuration data has been read out. This approach can be useful, for example, to provide a visual cue to a user, in response to which the user can manually operate the host circuit 216 for communicating with the reader device 230.

Figure 3:
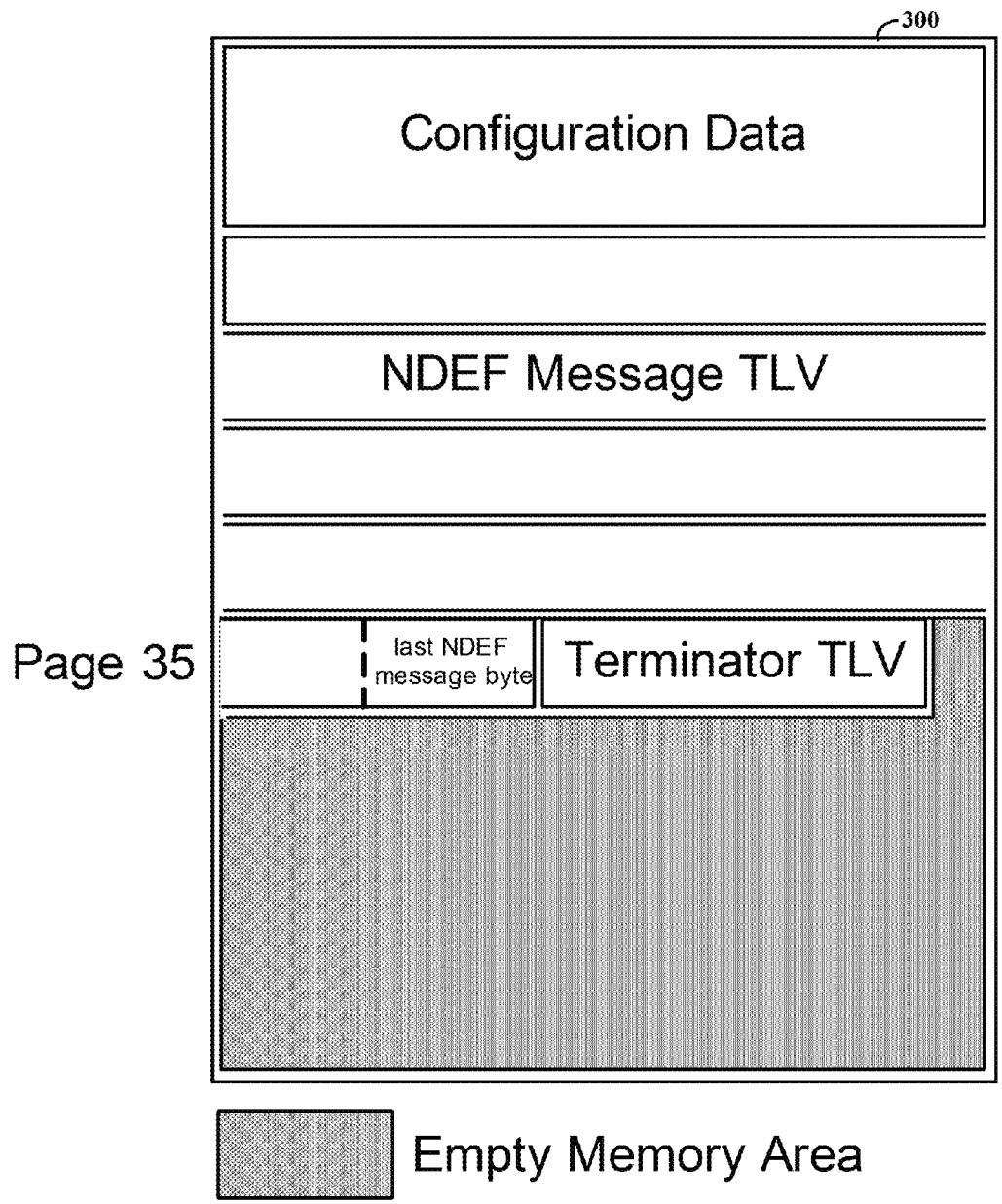
FIG. 3 shows an NFC tag, in accordance with another example embodiment.

FIG. 3 shows an NFC tag 300 implemented in accordance with the NDEF Type 2 specification discussed above, in accordance with one or more example embodiments. The NFC tag 300 may, for example, be implemented as the NFC tag 212 in FIG. 2, and the following discussion uses this context. The NFC tag 300 stores the last byte of an NDEF message at the page number 35, and also stores a LAST_NDEF_BYTE_ADDRESS (as above) equal to the page address 35. When the NFC device 232 reads the page address 35, an NDEF_READ register in the NFC tag 300 changes its value (e.g., from 0 to 1) and the field detection pin 217 transitions (e.g., from high to low), which triggers the host 216 to poll a status register and conclude that the last NDEF byte is read. The NDEF_READ register is either reset to 0 automatically after reading by the host or explicitly via the host writing the NDEF_READ register.

In some implementations, the NFC tag 300 changes the signal at the field detection pin either when the NFC tag is removed from the field (generated by the reader 230) or when the NDEF message has been fully read. To distinguish such situations, the host 212 uses a value from the NDEF_READ register. For instance, a change in the field detection pin 217 with the NDEF_READ register equal to 0 indicates that the field has disappeared before the NDEF message has been fully read, and a change in the field detection pin with the NDEF_READ register equal to 1 indicates that the field has been kept until the NDEF message has been fully read.

Based upon the above discussion and illustrations, those skilled in the art will readily recognize that various modifications and changes may be made to the various embodiments without strictly following the exemplary embodiments and applications illustrated and described herein. For example, apparatuses and approaches described herein can be implemented with a variety of different types of circuits and communications, such as various NFC Forum tags, NTAG type devices from NXP Semiconductors of Eindhoven, The Netherlands, or other contactless tags having a wired interface. Such modifications do not depart from the true spirit and scope of various aspects of the invention, including aspects set forth in the claims.

What is claimed is:

1. An apparatus comprising:
a near-field communication (NFC) protocol tag circuit including an antenna circuit, a first register circuit having configuration data configured and arranged to facilitate remote-field communications via a second protocol that is different than the NFC protocol, and a second register circuit having data indicative of a last accessed byte of the configuration data, the NFC tag circuit being configured and arranged to, using radio frequency energy received from a remote reader circuit,
in response to a NFC protocol radio frequency communication received from the remote reader circuit via the antenna circuit, access the configuration data from the first register and transmit the accessed configuration data via the antenna circuit using the NFC protocol, and
based on the data indicative of the last accessed byte of the configuration data, generate a trigger signal in response to a last byte of the configuration data being accessed; and
a host circuit connected to the NFC tag circuit and configured and arranged to operate in a sleep mode in which the host circuit does not wirelessly communicate via the second protocol,
transition from the sleep mode to a wake mode in response to receiving the trigger signal from the NFC tag circuit, and
while operating in the wake mode, communicate with the reader circuit via radio frequency communications of the second communication protocol.

2. The apparatus of claim 1, wherein the NFC protocol tag circuit is configured and arranged to
in response to a read command received from the host circuit via a wired interface, access the configuration data from the first register and provide the accessed configuration data to the host circuit, and
based on the data indicative of the last accessed byte of the configuration data, generate a trigger signal in response to a last byte of the configuration data being accessed for providing the configuration data to the host circuit.

3. The apparatus of claim 1, further including a third register circuit having data indicative of a read status of an NFC data exchange format (NDEF) message data, wherein the NFC protocol tag circuit is configured and arranged to
set a value of the data in the third register based on the data indicative of the last accessed byte of the configuration data, and generate the trigger signal based upon the value of the data in the third register.

4. The apparatus of claim 1, wherein the host circuit is configured and arranged to communicate with the remote reader circuit in response to receiving a radio frequency communication of the second communication protocol type, by verifying the received radio frequency communication using the configuration data.

5. The apparatus of claim 1, wherein the host circuit is configured and arranged to access the configuration data in response to the trigger signal.

6. The apparatus of claim 1, wherein the host circuit is configured and arranged to
access the configuration data by accessing the data in response to the trigger signal, and
communicate with the reader circuit via the radio frequency communications in response to receiving a radio frequency communication of the second communication protocol type, by verifying the received radio frequency communication using the configuration data.

7. The apparatus of claim 1, wherein the NFC protocol tag circuit is configured and arranged to generate the trigger signal in response to the last byte of the configuration data being accessed by generating the trigger signal in response to a request for reading a last byte of the configuration data.

8. The apparatus of claim 1, wherein the NFC protocol tag circuit is configured and arranged to generate the trigger signal in response to the last byte of the configuration data being accessed by generating the trigger signal in response to transmitting the last byte of the configuration data.

9. The apparatus of claim 1, wherein the configuration data includes bytes of data in a sequence, and the NFC protocol tag circuit is configured and arranged to
transmit the accessed configuration data via the antenna circuit by transmitting the configuration data sequentially, and
generate the trigger signal in response to the last byte of the configuration data being accessed by generating the trigger signal in response to transmitting the last byte in the sequence of the configuration data.

10. The apparatus of claim 1, wherein
the data indicative of a last byte of the configuration data is data indicating a total number of bytes in the configuration data, and
the NFC protocol tag circuit is configured and arranged to generate the trigger signal in response to the last byte of the configuration data being accessed by generating the trigger signal in response to detecting that the total number of bytes have been accessed.

11. The apparatus of claim 1, wherein
the NFC protocol tag circuit is configured and arranged with a memory circuit that stores encryption data, and
the host circuit is configured and arranged to communicate with the remote reader circuit by accessing the encryption data via the interface and using the encryption data to communicate with the remote reader circuit.

12. The apparatus of claim 1, wherein
the NFC protocol tag circuit and the host circuit are connected via a first data communication terminal for providing access to the first register circuit by the host circuit and for communicating data including the configuration data between the host circuit and the NFC protocol tag circuit,
the NFC protocol tag circuit has a second terminal, and
the NFC protocol tag circuit and the host circuit are connected via the second terminal and configured and arranged to communicate the trigger signal from the NFC protocol tag circuit to the host circuit via the second terminal.

13. An apparatus comprising:
a near-field communication (NFC) antenna;
a NFC tag circuit that stores NFC data exchange format (NDEF) message data and that is configured and arranged to transmit the NDEF message data using a NFC protocol via the NFC antenna;
a host circuit having a processor;
a data communication circuit connected to the NFC tag circuit and the host circuit and configured and arranged to pass data from the host circuit to the NFC tag circuit and from the NFC tag circuit to the host circuit;
a field detection circuit connected between the NFC tag circuit and the host circuit;
in the NFC tag circuit,
a first register circuit configured and arranged with stored data indicative of a read status of the NDEF message data;
a second register circuit configured and arranged with stored data indicative of a last byte of the NDEF message data, the NFC tag circuit being configured and arranged to set the data in the first register circuit to indicate that the NDEF message data has been read, responsive to the transmission of the NDEF message data and based upon the data indicative of the last byte of the NDEF message data; and
a trigger circuit configured and arranged to generate a trigger signal in response to the data indicative of the read status of the NDEF message data indicating that the last byte of the NDEF message data has been read, and to present the trigger signal via the field detection circuit.

14. The apparatus of claim 13, wherein the NFC tag circuit includes a radio frequency (RF) energy circuit configured and arranged to power the NFC tag circuit using RF power received from a remote reader circuit via the antenna.

15. The apparatus of claim 13, wherein the NFC tag circuit is configured and arranged to, in response to receiving a NFC communication from a remote reader circuit via the antenna, access and transmit configuration data to the remote reader circuit, via the antenna circuit, using the NFC protocol.

16. The apparatus of claim 13, wherein the host circuit is configured and arranged to
communicate with a remote device using a wireless communication protocol that is different than the NFC protocol,
operate in a sleep mode in which the host circuit does not wirelessly communicate via the wireless communication protocol, and
transition from the sleep mode to a wake mode in response to receiving the trigger signal via the field detection circuit, and operating in the wake mode to communicate with the remote device using the wireless communication protocol.

17. The apparatus of claim 13, wherein the NFC tag circuit is configured and arranged to generate the trigger signal in response to at least one of: a request for reading the last byte of the NDEF message data, and the communication of the last byte of the NDEF message data.

18. A method comprising:
transmitting stored NFC data exchange format (NDEF) message data via an NFC antenna, using a NFC protocol;
storing, in a first register circuit, data indicative of a read status of the NDEF message data;

storing, in a second register circuit, data indicative of a last byte of the NDEF message data;

setting the data in the first register circuit to indicate that the NDEF message data has been read, in response to the transmission of the NDEF message data and based upon the data indicative of the last byte of the NDEF message data; and generating a trigger signal in response to the data indicative of the read status of the NDEF message data indicating that the last byte of the NDEF message data has been read.

19. The method of claim 18, wherein the step of transmitting includes transmitting the NDEF message data in response to receiving a NFC communication from a remote reader circuit, the NDEF message data including data for establishing a wireless communication link using a wireless communication protocol that is different than the NFC protocol, wherein the step of generating includes generating the trigger signal in response to the NDEF message data being transmitted to the reader circuit, and presenting the trigger signal to a host circuit, and further including, in response to the trigger signal, communicating wirelessly between the host circuit and the reader circuit via the wireless communication protocol.

20. The method of claim 19, further including, operating the host circuit in a sleep mode in which the host circuit does not wirelessly communicate via the wireless communication protocol, and wherein communicating wirelessly between the host circuit and the reader circuit via the wireless communication protocol in response to the trigger signal includes transitioning between the sleep mode and a wake mode in which the host circuit communicates with the reader circuit using the wireless communication protocol.

* * * * *